United States Patent [19]
Martin et al.

[11] Patent Number: 6,127,860
[45] Date of Patent: Oct. 3, 2000

[54] LINEAR EXPANSION BASED SINE GENERATOR

[75] Inventors: David G. Martin, Bethlehem; Xiao-an Wang, Allentown, both of Pa.

[73] Assignee: Lucent Technologies, Inc., Murray Hill, N.J.

[21] Appl. No.: 08/971,430

[22] Filed: Nov. 17, 1997

[51] Int. Cl.[7] .................................................. H03B 21/00
[52] U.S. Cl. ................... 327/106; 327/129; 364/718.03; 364/721
[58] Field of Search ..................................... 327/105–107, 327/129; 364/718–721, 607, 729; 341/144, 147

[56] References Cited

U.S. PATENT DOCUMENTS 4,975,699  12/1990  Frey ........................................ 341/118

*Primary Examiner*—Timothy P. Callahan
*Assistant Examiner*—Minh Nguyen

[57] ABSTRACT

An apparatus and method for generating a sine wave signal for a desired phase input. The sine wave signal is generated by implementing a linear expansion of the sine function. An incoming phase value is divided into a base phase value and an incremental phase value. The sine value for each base phase value is stored in a look-up table. The sine values for phase values falling between base phase values are generated using a linear expansion of the sine function.

14 Claims, 4 Drawing Sheets

LINEAR EXPANSION BASED SINE GENERATOR

FIELD OF THE INVENTION

This invention relates generally to sine waveform generators used in digital modulators and demodulators, and in particular to wideband digital down converters (WDDC) for high precision sine waveform generation.

BACKGROUND OF THE INVENTION

In transmission systems, a sine or cosine carrier wave is generated and provided to a digital modulator or demodulator to modulate or demodulate a signal. In many instances, it is desirable that the frequency of the carrier wave be programmable. A typical sine or cosine generator includes a sine look-up table.

The sine look-up table (LUT) includes data values representative of a sine carrier waveform for discrete phase values. The discrete values are determined by dividing the phase interval $[0, 2\pi]$, into smaller intervals. A representative data value of the sine carrier waveform is chosen for each interval. Each representative value is stored in a LUT which may be implemented in a memory such as a RAM or ROM. The correspondence between the discrete phase value, the data values, the sine value, and the address data is shown in Table 1 below.

TABLE 1

| phase value | address | data | sine value |
|---|---|---|---|
| 0 | 000 | 0000 | 0 |
| $\pi/4$ | 001 | 0101 | 0.707 |
| $\pi/2$ | 010 | 0111 | 1 |
| $3\pi/4$ | 011 | 0101 | 0.707 |
| $\pi$ | 100 | 0000 | 0 |
| $5\pi/4$ | 101 | 1011 | −0.707 |
| $3\pi/2$ | 110 | 1001 | −1 |
| $7\pi/4$ | 111 | 1011 | −0.707 |

There are eight entries in Table 1 for each of eight phase values. In this case, the interval $[0, 2\pi]$ has been divided into eight smaller intervals. The entry for each phase value contains a four bit word that corresponds to the sine value of its respective phase value. The data in Table 1 is stored in two's complement format where, for example, a value of 0111 corresponds to a sine value of 1.

FIG. 1 is a flow chart of a prior art method using a sine look-up table to generate a sine carrier. At step 100, a phase value is provided to the sine LUT. The phase value includes P bits that represent one of the phase intervals for which a sine value is to be provided. At step 110, the sine value corresponding to the phase value is retrieved from the LUT. The address of the sine value to be retrieved is specified by the P bits. At step 120, the sine value is provided to a modulator or demodulator as a carrier wave.

The sine look-up table shown in Table 1 contains data for one full cycle of a sine wave and includes data values for phases ranging from 0 to $2\pi$. The size of the sine look-up table may be reduced to a quarter sine table because of the symmetry of the sine function.

The precision of a sine wave generated using the sine LUT is directly related to the number of phase entries in the LUT and the number of quantizations in data. The signal-to-noise ratio (SNR) of the sine wave signal generated by using a sine look-up table is limited by the finite number of phase intervals and the finite quantization of the implementation. The SNR of a sine wave signal generated using a sine look-up table is set forth in equation (1) below.

$$SNR = \frac{1}{\frac{\pi^2}{3}2^{-2p} + \frac{1}{6}2^{-2q}} \quad (1)$$

In equation (1), p is the number of address bits of the sine LUT and q is the number of quantization bits of each entry in the sine look-up table. Digital modulators or demodulators having a SNR above 80 dB have very large values of p and q. For example, to achieve a SNR of 100 dB, values of p=18 and q=16 can be used. A value of p=18 corresponds to a sine table with $2^{18}$ entries. If implemented using a quarter sine table, this can be reduced to $2^{16}$ or 64K entries. With a q value of 16, this corresponds to a sine table size of 64K×16 for a SNR of 100 dB. This is a large look-up table that, if implemented in a semiconductor device, occupies a substantial area of the die. For example, the die area requirement to use a sine look-up table method to generate a sine or cosine carrier wave may be prohibitive for a multi-channel wideband digital down converter (WDDC) having multiple high precision sine look-up tables.

To overcome the shortcomings of conventional methods of generating a sine carrier, a new method and apparatus are provided. An object of the present invention is to provide a method of generating a sine value responsive to an input phase value. A related object is to provide an apparatus for generating a sine value responsive to an input phase value that occupies significantly less space on a die than prior art sine value generators.

SUMMARY OF THE INVENTION

The present invention provides an apparatus and method for generating a sine wave signal for a desired phase input. The phase input is partitioned into a base phase signal and an incremental phase signal. A sine signal is provided for the base phase signal. A cosine signal is provided for the base phase signal. The sine wave signal is produced by adding the sine signal to the product of the cosine signal and the incremental phase signal.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Overview

Figure 4:
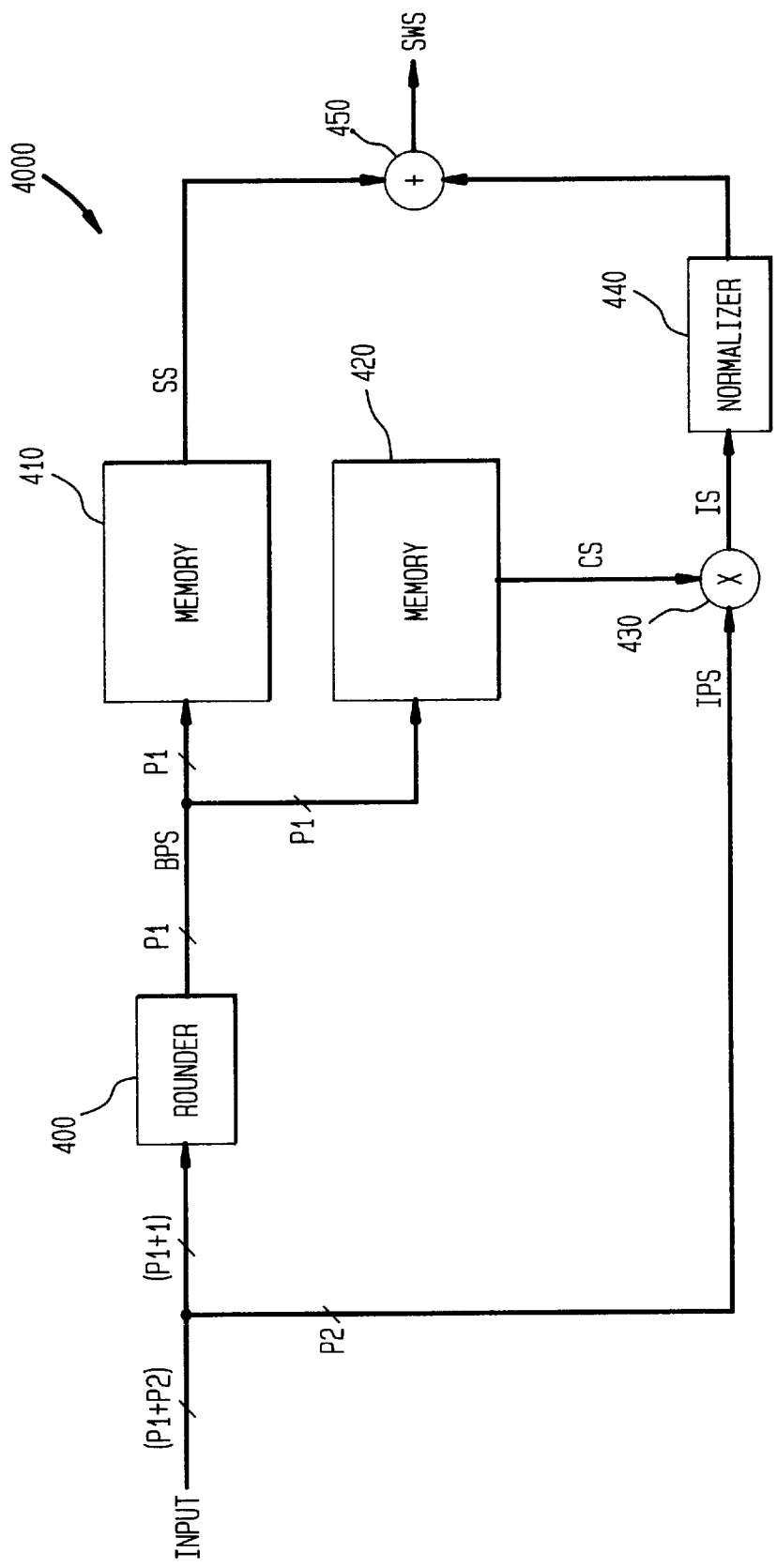
FIG. 4 is a block diagram of a sine wave signal generator according to an exemplary embodiment of the present invention.

Referring now to the drawing, wherein like reference numerals refer to like elements throughout, FIG. 4 shows a signal generator 4000 that may be used to generate a sine wave signal SWS for a desired phase represented by a phase input signal INPUT including (P1+P2) bits. The rounder 400 rounds the (P1+1) most significant bits to P1 bits which represent a base phase signal BPS. The memory 410 produces a sine signal SS responsive the base phase signal BPS. The memory 420 produces a cosine signal CS responsive the base phase signal BPS. The P2 least significant bits (LSBs) of the phase input signal INPUT represent the incremental phase signal IPS. The incremental phase signal IPS and the cosine signal CS are multiplied by multiplier 430 to produce an intermediate signal IS. The IS is normalized by a normalizer 440 and added to the sine signal SS by an adder 450 to produce the sine wave signal SWS.

Description of the Exemplary Embodiments

Figure 2:
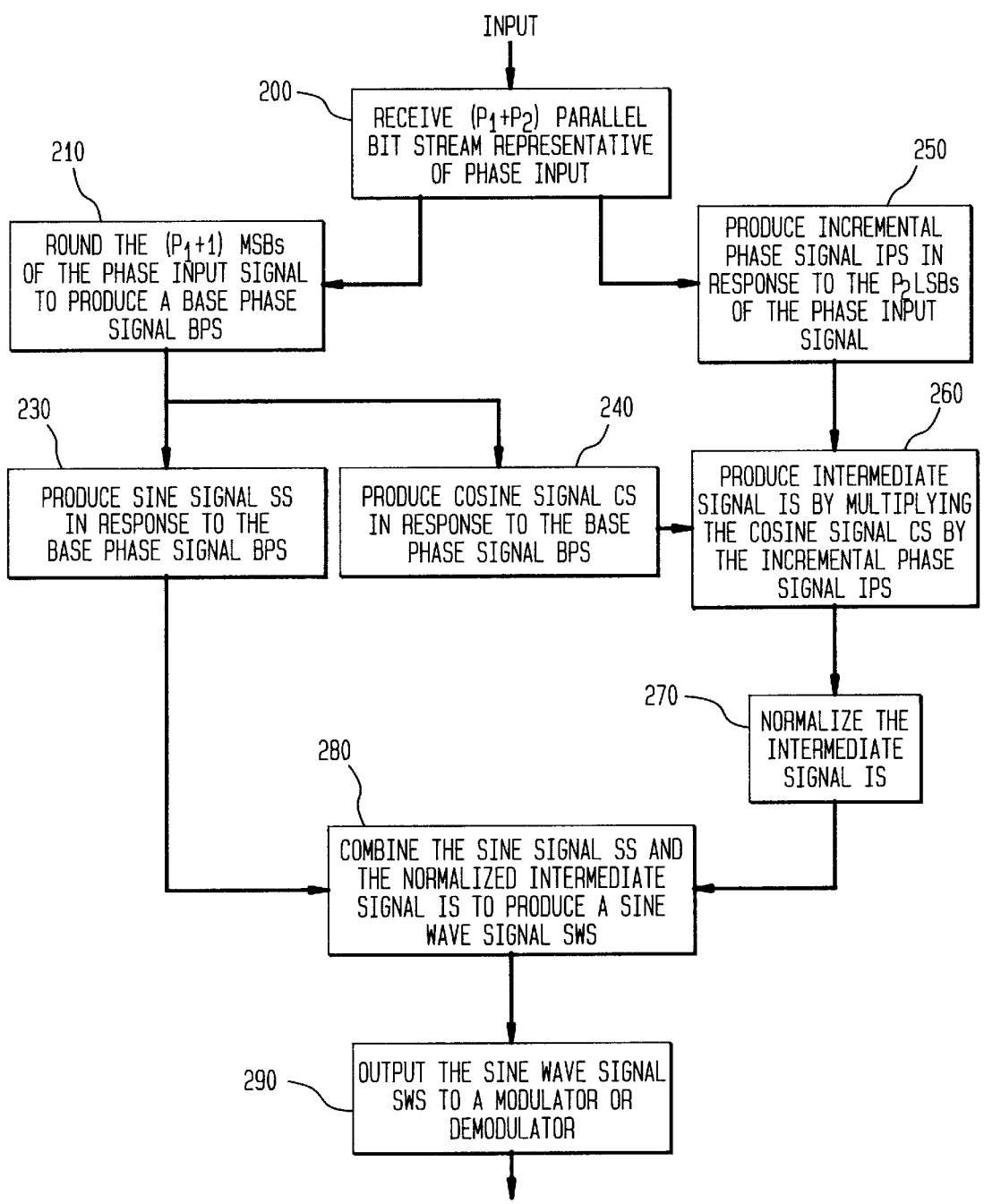
FIG. 2 is a flow chart of a method of generating a sine wave signal according to an exemplary embodiment of the present invention.

FIG. 2 shows a flow chart of a method for generating a sine wave signal according to an exemplary embodiment of the present invention. The method generates a sine wave signal for a desired phase by implementing a Taylor series of the sine function expanded to the linear term as set forth in equation (2) below.

$$\sin(x_i + \delta_p) = \sin x_i + \delta_p \cos x_i + o(\delta_p^2) \quad (2)$$

Figure 1:
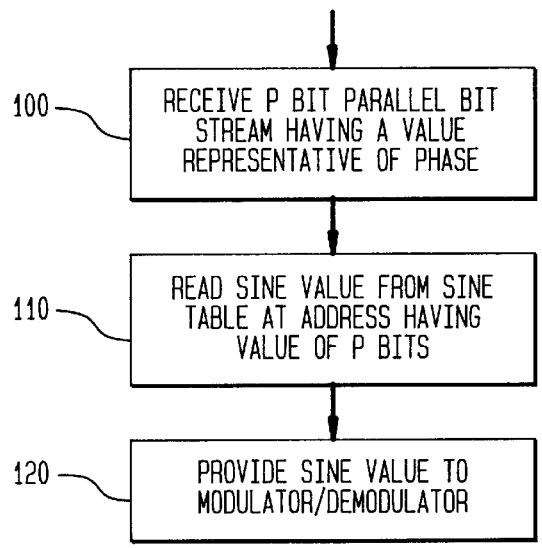
FIG. 1 is a flow chart of a prior art method of generating a sine waveform using a sine look-up table.
Figure 3:
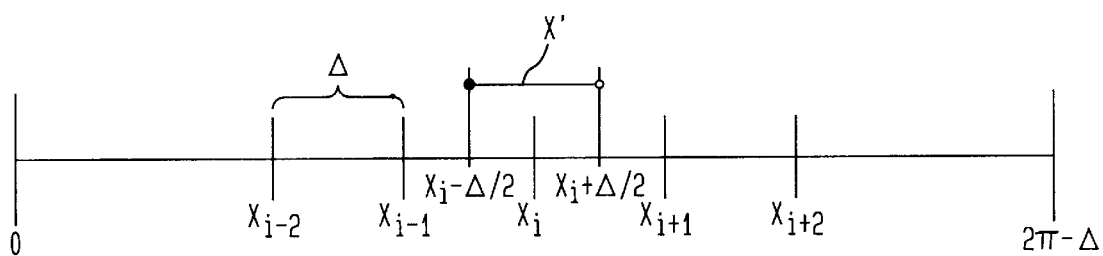
FIG. 3 is a diagram showing the relationship between base phase values and incremental phase values.

In equation (2), the term $X_i$ is a base phase value, the term $\delta_p$ is an incremental phase value where $-\Delta/2 \leq \delta_p < \Delta/2$ and $\Delta$ is the phase difference between consecutive base phase values. The term $o(\delta_p^2)$ represents an error that varies with the square of $\delta_p$ that is due to the truncation of the Taylor series after the linear term. FIG. 3 is a diagram showing the relation between the base phase values $(0, \ldots, X_{i-1}, X_i, X_{i+1}, \ldots, 2\pi-\Delta)$ which range from 0 to $2\pi-\Delta$, and the incremental phase values $\delta_p$.

The error term $o(\delta_p^2)$ is discarded because further expansion of the Taylor series does not result in significant improvements in the SNR because of the presence of other noise sources. The SNR of the sine wave signal generator 4000 is set forth in equation (3) below.

$$SNR = \frac{1}{\frac{\pi^2}{3} 2^{-2(p_1+p_2)} + \frac{1}{6} 2^{-2q_1} + \frac{\pi^2}{36} 2^{-(p_1+q_c)} + \frac{\pi^4}{40} 2^{-4p_1}} \quad (3)$$

There are four noise sources represented in the SNR of the sine wave signal generator described by equation (3) above. The noise sources are phase jitter noise due to a finite number of base phase values, quantization noise due to a finite number of output bits, quantization noise due to a finite number of bits of cosine data, and the error due to the remainder of terms of the Taylor series that were truncated. The exemplary system and method extend the Taylor series to the linear term and truncate the remainder while ignoring the truncation error.

Although not described with respect to the preferred embodiments presented, the scope of this invention is not limited to the expansion of the Taylor series only to the linear term. One of ordinary skill in the art can apply the teachings of this invention to further expand the Taylor series and reduce the additional noise sources as a particular design requires.

Returning to FIG. 2, at step 200, a first signal INPUT is received. The first signal INPUT includes a quantity of (P1+P2) bits which indicate the desired phase of the sine wave to be produced. At step 210, the (P1+1) most significant bits (MSBs) of the phase input are rounded to form P1 rounded bits. The P1 rounded bits indicate the base phase value. As shown in FIG. 3, the (P1+1) bit phase signal representing a value of X' where $X_i - \Delta/2 \leq X' < X_i + \Delta/2$ is rounded to a P1 bit base phase signal representing the base phase value $X_i$. At step 230, a sine signal SS is produced in response to the received base phase signal BPS. At step 240, a cosine signal CS is produced in response to the received base phase signal BPS.

At step 250, the P2 least significant bits (LSBs) of the first signal INPUT are provided. The P2 LSBs of the first signal INPUT represent the incremental phase signal (IPS). At step 260, the P2 bit incremental phase signal IPS and the cosine signal CS are multiplied to produce an intermediate signal IS. At step 270, the intermediate signal IS is normalized. At step 280, the normalized intermediate signal IS and the sine signal are added to produce a sine wave signal for the phase input. At step 290, the sine wave signal is provided to a modulator or demodulator.

By using the method of FIG. 2, the size of the memories used to produce the sine wave signal may be reduced. For example, for an equivalent SNR, step 230 and step 240 can be implemented in a memory that is smaller in size than a memory to implement a look-up table of a typical sine generator.

FIG. 4 shows a block diagram of an exemplary sine wave signal generator 4000 for generating a sine wave signal according to an embodiment of the present invention. The sine wave signal generator of FIG. 4 generates a sine wave signal by implementing a Taylor series of the sine function expanded to the linear term as set forth in equation (2) above. The sine wave signal generator provides a sine signal SS and cosine signal CS in response to a base phase signal BPS and generates a sine wave signal for phase values falling between the base phase values represented by the base phase signal BPS.

In FIG. 4, the sine wave generating apparatus 4000 has a phase input signal INPUT including (P1+P2) bits that indicate the desired phase of a sine wave signal SWS to be generated. The (P1+1) most significant bits (MSBs) of the phase input signal are provided to a rounder 400. The rounder 400 rounds the (P1+1) MSBs to generate a base phase signal BPS including P1 bits. With reference to FIG. 3, the rounder 400 rounds a value represented by (P1+1) bits falling in the range of X' where $X_i - \Delta/2 \leq X' < X_i + \Delta/2$, to a base phase value of $X_i$ represented by base phase signal BPS. Thus, the desired phase is rounded to the nearest base phase value.

The base phase signal BPS is provided to the memory 410 and memory 420. The memory 410 includes a LUT having $2^{P1}$ sine values corresponding to $2^{P1}$ base phase values. The memory 420 includes a LUT having $2^{P1}$ cosine values corresponding to $2^{P1}$ base phase values. The memory 410 outputs a sine signal SS corresponding to the base phase signal BPS. The memory 420 outputs a cosine signal CS corresponding to the base phase signal BPS.

The incremental phase signal IPS, represented by the P2 least significant bits (LSBs) of the phase input signal, represents the incremental phase value. The incremental phase signal IPS and the cosine signal CS from the memory 420 corresponding to the base phase signal BPS are provided to a multiplier 430 and multiplied to produce an intermediate signal IS. The intermediate signal IS is normalized by a normalizer 440.

In a preferred embodiment, the cosine values in memory 420 range from $-2\pi$ to $+2\pi$ rather than from $-1$ to $+1$. The differential between sequential P2 bit IPS values represents $2\pi/(2^{P1+P2})$. The $2\pi$ factor is accounted for by scaling the cosine signal CS by $2\pi$. Thus, an additional multiplying stage is not required to account for the $2\pi$ factor. However, in another embodiment, if the cosine values range from $-1$ to $+1$, an additional multiplying stage and modification of the normalization process may be required.

As known to those skilled in the art, the output of the adder can be normalized by first being rounded and then being shifted. In a preferred embodiment where the cosine values in memory 420 range from $-2\pi$ to $+2\pi$, if the sine values in the memory 410 are represented by a sine signal including $q_1$ bits, and the cosine values in the memory 420 are represented by a cosine signal of $q_c$ bits, the rounded output of the adder will be shifted to the right by $(P1+P2+q_c-q_1-3)$ bits. For example, if $(P1+P2+q_c-q_1-3)=4$, and if the IS signal includes ten (10) bits, one way to round the IS signal is by adding a binary signal of 0000001000 to the IS signal. In this example, the rounded value can then be shifted to the right by four (4) bits to drop the four (4) least significant bits (LSBs).

The sine signal SS from the memory 410 corresponding to the base phase signal BPS and the normalized output of the normalizer 440 are added by the adder 450. The output of the adder 450 is the sine wave signal SWS for the phase input signal indicated by the (P1+P2) bits.

Figure 5:
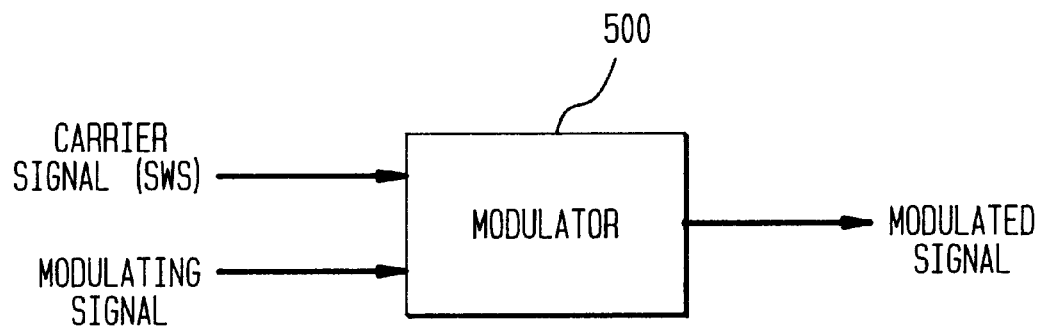
FIG. 5 is a block diagram of modulator using the sine wave signal as a carrier wave that is modulated by a modulating signal.
Figure 6:
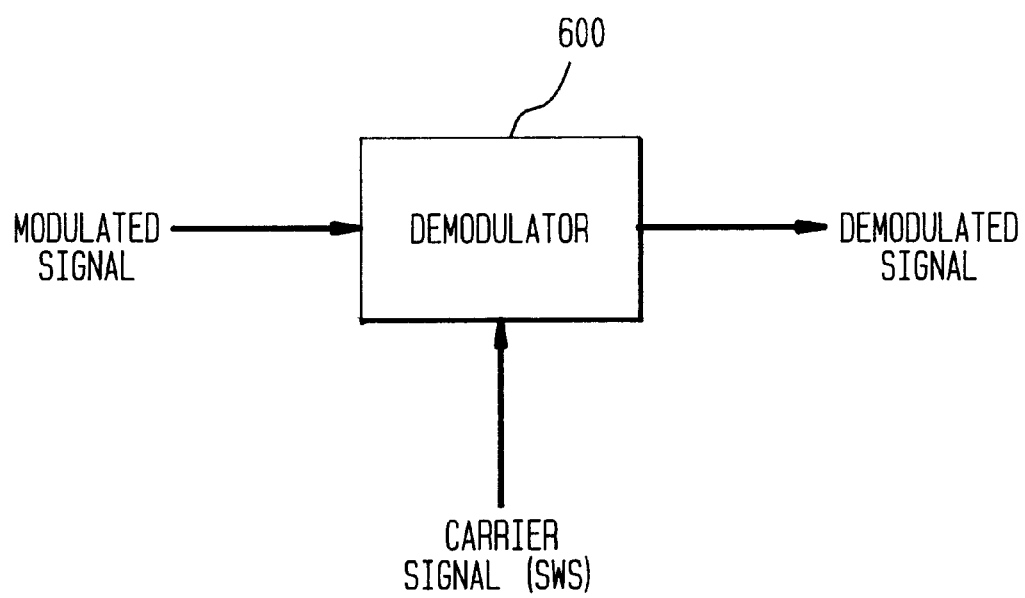
FIG. 6 is a block diagram of a demodulator using the sine wave signal as a carrier wave to demodulate a modulated signal.

The sine wave signal SWS output of the adder 450 may then be provided to a digital modulator or demodulator for use as a carrier signal. As shown in FIG. 5, the modulator 500 may modulate a carrier signal such as the sine wave signal SWS with a modulating signal to provide a modulated signal. As shown in FIG. 6, a demodulator 600 may demodulate a modulated signal using a carrier signal such as the sine wave signal SWS to provide a demodulated signal.

The SNR for a sine wave signal generated by the signal generator 4000 of FIG. 4 is set forth in equation (3) above. The particular values chosen for P1, P2, $q_c$, and $q_1$, will vary with the design requirements of a particular implementation. Changes in these values also effect the size of the memories 410 and 420 as well as other components. For example, in the case where the number of bits used for quantizing the cosine values in the memory 420 is reduced, the size of the multiplier 430 may also be reduced.

The present invention allows the generation of a sine or cosine carrier with a given SNR with reduced die area requirements. Table 2 below lists die area requirements of the sine look-up table approach of the prior art and of the sine wave signal generator of the present invention.

TABLE 2

|  | SNR | Memory 410 Size | Memory 420 Size | Multiplier 430 Size |
|---|---|---|---|---|
| Prior Art | 100 dB | 64 K × 16 | N/A | N/A |
| Present Invention | 98 dB | .25 K × 16 | .25 K × 7 | 8 × 7 |
| Present Invention | 105 dB | .5 K × 17 | .25 K × 8 | 8 × 8 |

As seen in Table 2 above, according to the present invention, a sine wave signal with a SNR of 98 dB can be generated with a savings in die area by a factor of approximately 50 over the prior art method of using a sine look-up table.

While full sized LUTs may be used in memory 410 and memory 420, it is preferable to use quarter size LUTs. This is possible due to the symmetry of the sine and cosine functions and will reduce the size of the memories 410, 420.

The present invention is not limited to generating sine or cosine carrier waves. The output of the signal generator may produce a variety of signals for other applications.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed is:

1. A signal generator for generating a sine wave signal having a desired phase comprising:

means for receiving a first signal including (P1+P2) bits indicating the desired phase;

partitioning means for partitioning the first signal into P1 bits indicating a base phase signal and P2 bits indicating an incremental phase signal, the partitioning means including a rounder for rounding the (P1+1) most significant bits of the first signal to generate the P1 bits indicating the base phase signal;

means for providing a sine signal responsive to the base phase signal;

means for providing a cosine signal responsive to the base phase signal; and processing means for producing the sine wave signal responsive to the sine signal, the cosine signal, and the incremental phase signal.

2. A signal generator for generating a sine wave signal having a desired phase comprising:

means for receiving a first signal indicating the desired phase;

partitioning means for partitioning the first signal into a base phase signal and an incremental phase signal;

means for providing a sine signal responsive to the base phase signal;

means for providing a cosine signal responsive to the base phase signal; and processing means for producing the sine wave signal responsive to the sine signal, the cosine signal, and the incremental phase signal, the processing means including:

means for multiplying the cosine signal and the incremental phase signal to generate an intermediate signal;

means for normalizing the intermediate signal to generate a normalized intermediate signal, the normalizing means including means for rounding the intermediate signal to generate a rounded intermediate signal and shifting means for shifting the rounded intermediate signal to generate the normalized intermediate signal; and means for adding the sine signal to the normalized intermediate signal.

3. A signal generator for generating a sine wave signal according to claim 4, wherein the first signal includes (P1+P2) bits, the sine signal is indicated by q1 bits, the cosine signal is indicated by qc bits, and the shifting means includes means for shifting the rounded intermediate signal to the right by (P1+P2+qc−q1−3) bits.

4. A signal generator for generating a sine wave signal having a desired phase comprising:

an input line coupled to receive a phase input signal including (P1+P2) bits;

a rounder coupled to the input line to receive (P1+1) most significant bits of the phase input signal to produce a base phase signal including P1 bits;

a first memory coupled to the rounder, the first memory having a first memory address specified by the base phase signal and a sine value stored in the first memory corresponding to the first memory address;

a second memory coupled to the rounder, the second memory having a second memory address specified by the base phase signal and a cosine value stored in the second memory corresponding to the second memory address;

a multiplier coupled to the input line to receive the P2 least significant bits of the phase input signal, and to the second memory to receive the cosine value;

a normalizer coupled to the multiplier; and an adder coupled to the normalizer and the first memory.

5. A signal generator according to claim 4, wherein:

the first memory has $2^{P1}$ sine values, and the second memory has $2^{P1}$ cosine values.

6. A signal generator according to claim 4, wherein the normalizer comprises:

a rounder providing an intermediate signal, and a shifter.

7. A signal generator according to claim 6, wherein:

the sine value is indicated by q1 bits, the cosine value is indicated by qc bits, and the shifter shifts the intermediate signal to the right by (P1+P2+qc−q1−3) bits.

8. A modulator including a signal generator for generating a sine wave signal having a desired phase comprising:

means for receiving a first signal including (P1+P2) bits indicating the desired phase;

partitioning means for partitioning the first signal into P1 bits indicating a base phase signal and P2 bits indicating an incremental phase signal, the partitioning mans including a rounder for rounding the (P1+1) most significant bits of the first signal to generate the P1 bits indicating the base phase signal;

means for providing a sine signal responsive to the base phase signal;

means for providing a cosine signal responsive to the base phase signal;

processing means for producing the sine wave signal responsive to the sine signal, the cosine signal, and the incremental phase signal; and modulating means for modulating the sine wave signal using a modulating signal.

9. A demodulator including a signal generator for generating a sine wave signal having a desired phase comprising:

means for receiving a first signal including (P1+P2) bits indicating the desired phase;

partitioning means for partitioning the first signal into P1 bits indicating a base phase signal and P2 bits indicating an incremental phase signal, the partitioning means including a rounder for rounding the (P1+1) most significant bits of the first signal to generate the P1 bits indicating the base phase signal;

means for providing a sine signal responsive to the base phase signal;

means for providing a cosine signal responsive to the base phase signal;

processing means for producing the sine wave signal responsive to the sine signal, the cosine signal, and the incremental phase signal; and demodulating means for demodulating a modulated carrier using the sine wave signal.

10. A method of generating a sine wave signal having a desired phase, the method comprising the steps of:

(a) receiving a first signal including (P1+P2) bits indicating the desired phase;

(b) partitioning the first signal into P1 bits indicating a base phase signal and P2 bits indicating an incremental phase signal, the partitioning means including a rounder for rounding the (P1+1) most significant bits of the first signal to generate the P1 bits indicating the base phase signal;

(c) providing a sine signal responsive to the base phase signal;

(d) providing a cosine signal responsive to the base phase signal; and (e) producing the sine wave signal responsive to the sine signal, the cosine signal, and the incremental phase signal.

11. A signal generator for generating an output signal responsive to an input signal comprising:

means for receiving a first signal including (P1+P2) bits indicating the input signal;

partitioning means for partitioning the first signal into P1 bits indicating a base signal and P2 bits indicating an incremental signal, the partitioning means including a rounder for rounding the (P1+1) most significant bits of the first signal to generate the P1 bits indicating the base phase signal;

means for providing a second signal responsive to the base signal;

means for providing a third signal responsive to the base signal; and processing means for producing the output signal responsive to the second signal, the third signal, and the incremental signal.

12. A signal generator for generating a sine wave signal having a desired phase comprising:

(a) an input line coupled to receive a phase input signal including (P1+P2) bits;

(b) a partitioner for partitioning the phase input signal to produce a base phase signal including P1 bits corresponding to a base phase and an incremental phase signal including P2 bits;

(c) a first memory coupled to the base phase signal for providing a sine value corresponding to the base phase signal;

(d) a second memory coupled to the base phase signal for providing a cosine value corresponding to the base phase signal;

(e) a multiplier coupled to the incremental phase signal and to the second memory for providing an intermediate signal equal to 2π(incremental phase signal)cosine(base phase);

and (f) an adder coupled to the multiplier and to the first memory, wherein the partitioner includes a rounder for receiving the (P1+1) most significant bits of the phase input signal to produce the P1 bit base phase signal.

13. An apparatus according to claim 12 wherein the second memory provides a cosine value corresponding to 2πcosine(base phase).

14. A signal generator for generating a sine wave signal having a desired phase comprising:

(a) an input line coupled to receive a phase input signal including (P1+P2) bits;

(b) a partitioner for partitioning the phase input signal to produce a base phase signal including P1 bits corresponding to a base phase and an incremental phase signal including P2 bits;

(c) a first memory coupled to the base phase signal for providing a sine value corresponding to the base phase signal;

(d) a second memory coupled to the base phase signal for providing a cosine value corresponding to the base phase signal;

(e) a multiplier coupled to the incremental phase signal and to the second memory for providing an intermediate signal equal to 2π(incremental phase signal)cosine(base phase);

(f) an adder coupled to the multiplier and to the first memory, and (g) a normalizer coupled to the multiplier for receiving the intermediate signal and providing a normalized intermediate signal, wherein the adder is coupled to the normalizer and adds the normalized intermediate signal to the sine value, and wherein the partitioner includes a rounder for receiving the (P1+1) most significant bits of the phase input signal to produce the P1 bit base phase signal and the second memory provides a cosine value corresponding to 2πcosine(base phase).

* * * * *